United States Patent
Poblete

(10) Patent No.: US 12,225,134 B2
(45) Date of Patent: Feb. 11, 2025

(54) SYSTEMS AND METHODS FOR DUAL HASH ROLLING PATCH SECURE AUTHENTICATION

(71) Applicant: Dell Products, L.P., Round Rock, TX (US)

(72) Inventor: Christopher Abella Poblete, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 197 days.

(21) Appl. No.: 18/047,363

(22) Filed: Oct. 18, 2022

(65) Prior Publication Data

US 2024/0129127 A1    Apr. 18, 2024

(51) Int. Cl.
*H04L 9/32*    (2006.01)

(52) U.S. Cl.
CPC .......... *H04L 9/3226* (2013.01); *H04L 9/3236* (2013.01); *H04L 9/3263* (2013.01)

(58) Field of Classification Search
CPC .... H04L 9/3226; H04L 9/3236; H04L 9/3263
See application file for complete search history.

(56) References Cited

U.S. PATENT DOCUMENTS

| | | | |
|---|---|---|---|
| 5,666,415 A * | 9/1997 | Kaufman | H04L 9/3236 713/172 |
| 6,079,021 A * | 6/2000 | Abadi | G06F 21/46 713/184 |
| 6,230,269 B1 * | 5/2001 | Spies | H04L 9/302 380/282 |
| 6,944,296 B1 * | 9/2005 | Liu | H04N 21/26613 705/56 |
| 6,981,145 B1 * | 12/2005 | Calvez | H04L 63/0869 709/225 |
| 6,996,714 B1 * | 2/2006 | Halasz | H04L 9/3273 713/168 |
| 7,650,509 B1 * | 1/2010 | Dunning | H04L 9/3297 713/168 |
| 8,756,672 B1 * | 6/2014 | Allen | G06F 21/36 726/19 |
| 8,868,923 B1 * | 10/2014 | Hamlet | G06F 21/00 326/8 |
| 8,966,597 B1 * | 2/2015 | Saylor | H04L 63/08 726/5 |
| 9,477,825 B1 * | 10/2016 | Sinchak | H04L 63/08 |
| 9,491,164 B1 * | 11/2016 | Fay | H04L 63/083 |
| 9,640,001 B1 * | 5/2017 | Vazquez | H04L 63/107 |
| 10,211,992 B1 * | 2/2019 | Tarandach | H04L 9/3268 |
| 10,878,207 B1 * | 12/2020 | Tran | G06K 19/0702 |
| 11,075,931 B1 * | 7/2021 | Warren | H04L 63/1416 |
| 11,321,448 B1 * | 5/2022 | Sanchez | H04L 9/3236 |

(Continued)

*Primary Examiner* — Aravind K Moorthy
(74) *Attorney, Agent, or Firm* — Fogarty LLP

(57) ABSTRACT

Embodiments of systems and methods to provide a firmware update to devices configured in a redundant configuration in an Information Handling System (IHS) are disclosed. In an illustrative, non-limiting embodiment, an IHS may include computer-executable instructions to receive a password comprising a first plurality of characters, concatenate a second plurality of characters to the hashed password to form a patched password, encrypt the patched password, and send the hashed patched password to a server IHS for authentication. The second characters are configured to continually change value over time.

17 Claims, 7 Drawing Sheets

(56) References Cited

U.S. PATENT DOCUMENTS

| | | | |
|---|---|---|---|
| 11,373,172 B1* | 6/2022 | Griffin | H04L 9/0897 |
| 11,405,189 B1* | 8/2022 | Bennison | H04L 9/0656 |
| 11,438,378 B1* | 9/2022 | Dell'Amico | H04L 9/3236 |
| 11,861,545 B1* | 1/2024 | Atkinson | G06Q 10/0835 |
| 11,936,796 B1* | 3/2024 | Allen | H04L 9/3263 |
| 11,943,215 B1* | 3/2024 | Nair | H04L 9/3226 |
| 2003/0188012 A1* | 10/2003 | Ford | G06F 21/31 |
| | | | 709/238 |
| 2004/0019786 A1* | 1/2004 | Zorn | H04L 63/061 |
| | | | 713/168 |
| 2004/0146164 A1* | 7/2004 | Jonas | H04L 9/0822 |
| | | | 380/284 |
| 2004/0158714 A1* | 8/2004 | Peyravian | H04L 9/3236 |
| | | | 713/171 |
| 2005/0250473 A1* | 11/2005 | Brown | H04L 9/3236 |
| | | | 455/411 |
| 2005/0259458 A1* | 11/2005 | Rustagi | G06F 21/6218 |
| | | | 365/63 |
| 2006/0036857 A1* | 2/2006 | Hwang | G06F 21/31 |
| | | | 713/168 |
| 2006/0195402 A1* | 8/2006 | Malina | H04L 9/14 |
| | | | 705/50 |
| 2007/0006305 A1* | 1/2007 | Florencio | H04L 63/1483 |
| | | | 726/22 |
| 2007/0014398 A1* | 1/2007 | Eldridge | H04L 9/0869 |
| | | | 380/44 |
| 2007/0157028 A1* | 7/2007 | Lott | H04L 9/3236 |
| | | | 713/182 |
| 2007/0198856 A1* | 8/2007 | Lee | G06F 21/85 |
| | | | 713/190 |
| 2007/0204330 A1* | 8/2007 | Townsley | H04L 61/5014 |
| | | | 726/4 |
| 2007/0220591 A1* | 9/2007 | Damodaran | H04L 63/0823 |
| | | | 726/4 |
| 2007/0283161 A1* | 12/2007 | Yami | H04L 9/3226 |
| | | | 713/183 |
| 2008/0244266 A1* | 10/2008 | Cai | H04L 63/083 |
| | | | 713/170 |
| 2009/0060187 A1* | 3/2009 | Doyle | H04L 63/0823 |
| | | | 713/176 |
| 2009/0147958 A1* | 6/2009 | Calcaterra | H04L 9/0833 |
| | | | 380/260 |
| 2009/0210712 A1* | 8/2009 | Fort | H04L 63/1441 |
| | | | 713/175 |
| 2010/0042839 A1* | 2/2010 | Ho | H04L 9/0841 |
| | | | 713/169 |
| 2010/0054475 A1* | 3/2010 | Schneider | H04L 9/0863 |
| | | | 380/277 |
| 2010/0058060 A1* | 3/2010 | Schneider | H04L 9/3271 |
| | | | 713/171 |
| 2011/0040946 A1* | 2/2011 | Courtney | G06F 21/44 |
| | | | 711/E12.001 |
| 2011/0191586 A1* | 8/2011 | Jung | H04L 9/3271 |
| | | | 713/168 |
| 2012/0284785 A1* | 11/2012 | Salkintzis | H04W 12/068 |
| | | | 726/7 |
| 2013/0042111 A1* | 2/2013 | Fiske | G06F 21/32 |
| | | | 713/170 |
| 2013/0262867 A1* | 10/2013 | Evancich | H04L 9/3226 |
| | | | 713/168 |
| 2014/0032922 A1* | 1/2014 | Spilman | G06F 21/602 |
| | | | 713/184 |
| 2014/0181893 A1* | 6/2014 | Von Bokern | H04L 63/0876 |
| | | | 726/1 |
| 2014/0189805 A1* | 7/2014 | Summers | H04L 63/1458 |
| | | | 726/4 |
| 2016/0044034 A1* | 2/2016 | Spilman | H04L 63/083 |
| | | | 713/181 |
| 2016/0048836 A1* | 2/2016 | Sabatier | G06Q 20/3829 |
| | | | 705/44 |
| 2016/0134660 A1* | 5/2016 | Ponsini | H04L 63/20 |
| | | | 726/1 |
| 2017/0063812 A1* | 3/2017 | Dash | H04L 9/0869 |
| 2017/0178127 A1* | 6/2017 | Kravitz | G06Q 20/38215 |
| 2017/0230372 A1* | 8/2017 | Weinstein | H04L 63/083 |
| 2017/0244698 A1* | 8/2017 | Gale | H04L 63/0853 |
| 2017/0295195 A1* | 10/2017 | Wettstein | H04L 63/1425 |
| 2017/0317828 A1* | 11/2017 | Reinhold | H04L 63/083 |
| 2018/0191688 A1* | 7/2018 | Chen | H04L 9/3226 |
| 2018/0191702 A1* | 7/2018 | Padmanabhan | H04L 63/083 |
| 2018/0247071 A1* | 8/2018 | Resch | H04L 63/083 |
| 2018/0288019 A1* | 10/2018 | Dinia | H04L 63/083 |
| 2019/0013945 A1* | 1/2019 | Hamlin | G06F 11/0709 |
| 2019/0180046 A1* | 6/2019 | Goenka | G06F 21/6245 |
| 2019/0220618 A1* | 7/2019 | Ocher | H04L 9/3239 |
| 2019/0268317 A1* | 8/2019 | Haelion | H04L 63/0435 |
| 2019/0305938 A1* | 10/2019 | Sandberg-Maitland | H04L 9/085 |
| 2019/0364041 A1* | 11/2019 | Durski | H04L 63/0428 |
| 2020/0127837 A1* | 4/2020 | Kaladgi | H04L 63/10 |
| 2020/0132761 A1* | 4/2020 | Rahardjo | G01R 31/3177 |
| 2020/0145498 A1* | 5/2020 | Grayson | H04L 63/0407 |
| 2020/0242256 A1* | 7/2020 | Kaczynski | H04L 51/046 |
| 2020/0295939 A1* | 9/2020 | Matovsky | H04L 63/083 |
| 2020/0366669 A1* | 11/2020 | Gupta | G06K 19/06028 |
| 2020/0374277 A1* | 11/2020 | Fuka | H04L 63/18 |
| 2021/0067322 A1* | 3/2021 | Hazan | H04L 9/0643 |
| 2021/0099302 A1* | 4/2021 | Lavery | G06F 21/32 |
| 2021/0157939 A1* | 5/2021 | Bilger | G06F 21/45 |
| 2021/0273800 A1* | 9/2021 | Hassani | H04L 9/3242 |
| 2021/0314176 A1* | 10/2021 | Cambou | H04L 9/0866 |
| 2022/0070000 A1* | 3/2022 | Gondza | H04L 63/123 |
| 2022/0103814 A1* | 4/2022 | Mehta | G06Q 20/401 |
| 2022/0198059 A1* | 6/2022 | Hatcher | G06F 21/606 |
| 2022/0263668 A1* | 8/2022 | Autiosalo | H04L 9/3297 |
| 2022/0286446 A1* | 9/2022 | Hecht | H04L 63/0435 |
| 2022/0294778 A1* | 9/2022 | Li | H04L 63/0838 |
| 2022/0300478 A1* | 9/2022 | Scott | G06F 16/2329 |
| 2022/0311597 A1* | 9/2022 | Goel | H04L 9/0891 |
| 2022/0336096 A1* | 10/2022 | Sanigepalli | G16H 40/63 |
| 2022/0338005 A1* | 10/2022 | Tamai | H04L 9/3228 |
| 2022/0374896 A1* | 11/2022 | Ma | G06Q 30/0229 |
| 2022/0413876 A1* | 12/2022 | Rajagopal | G06F 9/4411 |
| 2023/0012084 A1* | 1/2023 | Herrero | H04L 9/3226 |
| 2023/0082633 A1* | 3/2023 | Seletskiy | H04L 63/0846 |
| | | | 726/7 |
| 2023/0103698 A1* | 4/2023 | Hayami | H04L 9/3226 |
| | | | 713/168 |
| 2023/0222205 A1* | 7/2023 | Nambannor Kunnath | G06F 21/45 |
| | | | 726/6 |
| 2023/0247436 A1* | 8/2023 | Boettger | H04W 12/06 |
| | | | 713/155 |
| 2023/0264709 A1* | 8/2023 | Wang | G06F 16/113 |
| | | | 701/122 |
| 2023/0283285 A1* | 9/2023 | Paxton | H03M 1/001 |
| | | | 713/168 |
| 2024/0045981 A1* | 2/2024 | Santaus | G06F 21/602 |

* cited by examiner

SYSTEMS AND METHODS FOR DUAL HASH ROLLING PATCH SECURE AUTHENTICATION

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Maintaining security across varying trust boundaries or domains over a communications network is an important facet of computing technology. A trust boundary may be referred to as a region within which a group of IHSs, their operations, and the data they use are trusted among one another. Typically, a trust boundary may be protected by computer security hardware and software such as firewalls, Virtual Private Networks (VPNs), intrusion detection and prevention systems, data leakage protections, antivirus programs, and the like. For an individual, a single laptop computer used in a person's home could comprise a trust boundary, while for an organization, a trust boundary may include an entire data center infrastructure, which may also include IHSs connected via VPNs.

SUMMARY

Embodiments of systems and methods to provide a firmware update to devices configured in a redundant configuration in an Information Handling System (IHS) are disclosed. In an illustrative, non-limiting embodiment, an IHS may include computer-executable instructions to receive a password comprising a first plurality of characters, concatenate a second plurality of characters to the hashed password to form a patched password, encrypt the patched password, and send the hashed patched password to a server IHS for authentication. The second characters are configured to continually change value over time.

According to another embodiment, a method includes the steps of receiving a password comprising a first plurality of characters, and concatenating a second plurality of characters to the hashed password to form a patched password. The second characters are configured to continually change value over time. The method further includes the steps of encrypting the patched password, and sending the hashed patched password to a server Information Handling System (HIS) for authentication.

According to yet another embodiment, a server Information Handling System (IHS) includes computer-executable instructions to, when executed on a server HIS, obtain a stored version of a first plurality of characters from a data store configured in the server HIS, concatenate a stored version of a second plurality of characters to the hashed password to form a patched password, and encrypt the patched password. The instructions may also compare the hashed patched password against another hashed patched password obtained from a client IHS to determine whether to authenticate the client IHS.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1A:
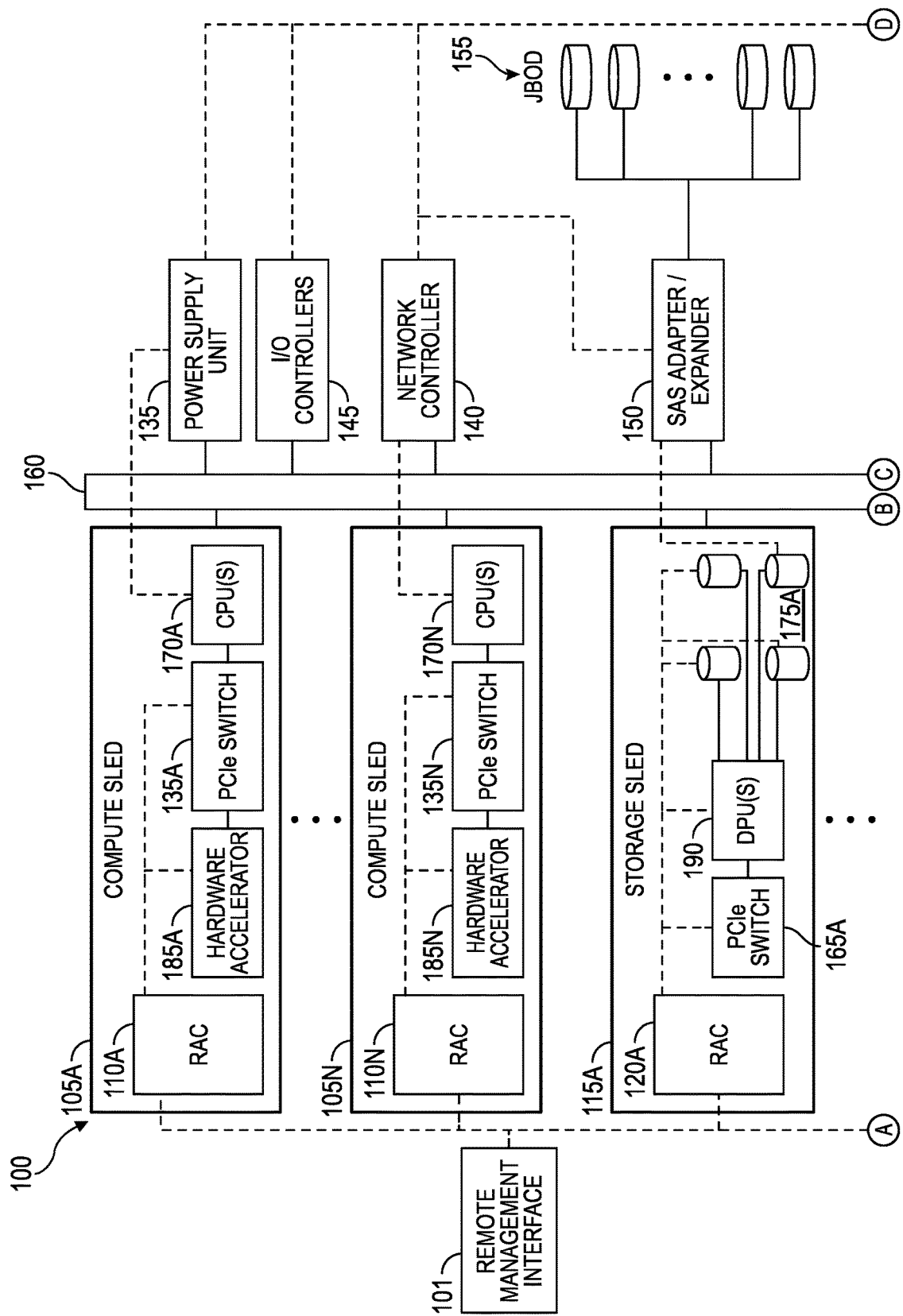
FIGS. 1A and 1B are block diagrams illustrating certain components of a chassis comprising one or more compute sleds and one or more storage sleds that may be configured to implement the systems and methods described according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Maintaining security across varying trust boundaries or domains is typically accomplished via the use of passwords. The term "password" generally refers to a string of characters that is secretly shared between two or more nodes on a network, such as a client IHS and an authentication server. Passwords can be exposed through the network. Because a publicly accessible network is inherently insecure, the password and any data it is supposed to protect can be vulnerable to exposure. Passwords can be encoded, but if retrieved it can be decoded, such as by a brute force attack. Transmission through the network should therefore use a secure socket with strong encryption, otherwise the password and its associated data may be vulnerable to exposure.

Passwords may be vulnerable to brute force cracking or guessing. As a result, passwords are required to be complex and long to be safe. To make it harder to crack, passwords should have a minimum length and contain a combination of lower and upper-case alphanumeric and non-alphanumeric characters. An added complexity is that different authentication services often use different character-based requirements. To make it harder to crack, certain authentication services may have additional restrictions, such as no repeating characters or minimum number of non-alphanumeric characters, and the like. An ideal complex password is not easy to remember. If the password is complex, users sometimes forget their password, thus requiring a reset of their password, while if the password is simple, it is easy to crack, especially if the complexity requirement is too lenient.

Passwords can be vulnerable to exposure if the client application is compromised, or the authentication server is compromised. Additionally, passwords can be vulnerable to exposure if the data store used by the authentication service is compromised. Passwords can be vulnerable to exposure if the user unintentionally reveals the password to other users, or stores the password in an insecure location that can be compromised. Using different passwords for different authentication services in combination with changing the password regularly may provide a sufficient way to protect against the aforementioned vulnerabilities of passwords to provide network security.

In general, passwords sent over publicly available networks can potentially be hacked. Passwords that can be encoded can also be decoded by bad actors (e.g., hackers). While passwords may be implemented with complexity, length, and/or expiration restrictions to make it harder to crack, users still tend to use passwords with simple and minimal length for easier recollection.

Conventional techniques for solving the aforementioned problems with typical password use have enjoyed limited success. One such technique has involved encryption. In general, encryption is the process of encoding information hi which original data (e.g., plaintext) is converted to another form, such as ciphertext. When sent over a publicly accessible network, such as the Internet, the encrypted text is accessible by others, however, it is mostly unintelligible except with knowledge of the algorithm used to encrypt the data. Nevertheless, problems continue to exist when use of weak or vulnerable encryption schemes can expose the entered password.

Multi-factor authentication and Virtual Private Networks (VPNs) generally comprise other conventional techniques that, although enhancing protection, provide little or no protection of entered password exposure. Yet another conventional technique involving account monitoring provides little or no protection of entered password exposure. While other conventional techniques, such as password complexity restrictions, password managers, biometric identity systems, and virus/malware scanners may make password cracking more difficult, they still provide little or no protection of password exposure. That is, a hacker can crack passwords using these techniques given the right tools and enough time. As will be described in detail herein below, embodiments of the present disclosure provide a solution to this problem, among other problems, via a dual hashing secure communications system and method that encrypts data using a continually changing (e.g., rolling) string of characters that are known by both the sender and receiver of the data. Such a system and method may be particularly beneficial in that replay attacks can be effectively remediated in some embodiments.

Figure 1B:
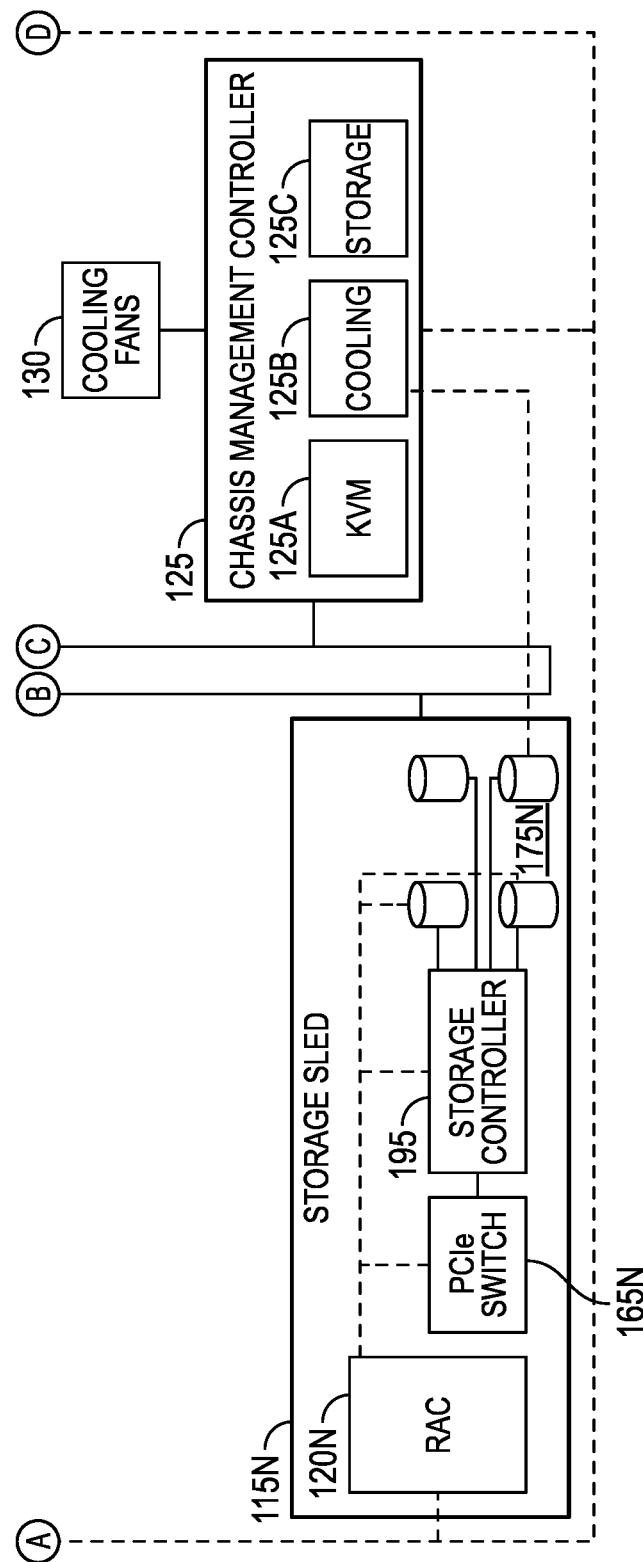

FIGS. 1A and 1B are block diagrams illustrating certain components of a chassis 100 comprising one or more compute sleds 105*a-n* and one or more storage sleds 115*a-n* that may be configured to implement the systems and methods described according to one embodiment of the present disclosure. Embodiments of chassis 100 may include a wide variety of hardware configurations in which one or more sleds 105*a-n*, 115*a-n* are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removable sleds 105*a-n*, 115*a-n* that are installed in the chassis. In addition, once the chassis 100 has been deployed, firmware used by individual hardware components of the sleds 105*a-n*, 115*a-n*, or by other hardware components of chassis 100, may be modified in order to update the operations that are supported by these hardware components.

Chassis 100 may include one or more bays that each receive an individual sled (that may be additionally or alternatively referred to as a tray, blade, and/or node), such as compute sleds 105*a-n* and storage sleds 115*a-n*. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with diverse types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105*a-n* and storage sleds 115*a-n*, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135*a-n*, 165*a-n* installed in the sleds 105*a-n*, 115*a-n* of the chassis. These high-speed data links may be used to support algorithm implementations that span multiple processing, networking, and storage components of an IHS and/or chassis 100. For instance, computational tasks may be delegated to a specific processing component of an IHS, such as to a hardware accelerator 185*a-n* that may include one or more programmable processors that operate separate from the main CPUs 170*a-n* of computing sleds 105*a-n*. In various embodiments, such hardware accelerators 185*a-n* may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the sleds 105a-n, 115a-n installed in chassis 100. In supporting airflow cooling, a rack may include one or more banks of cooling fans 130 that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans 130 to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support diverse types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
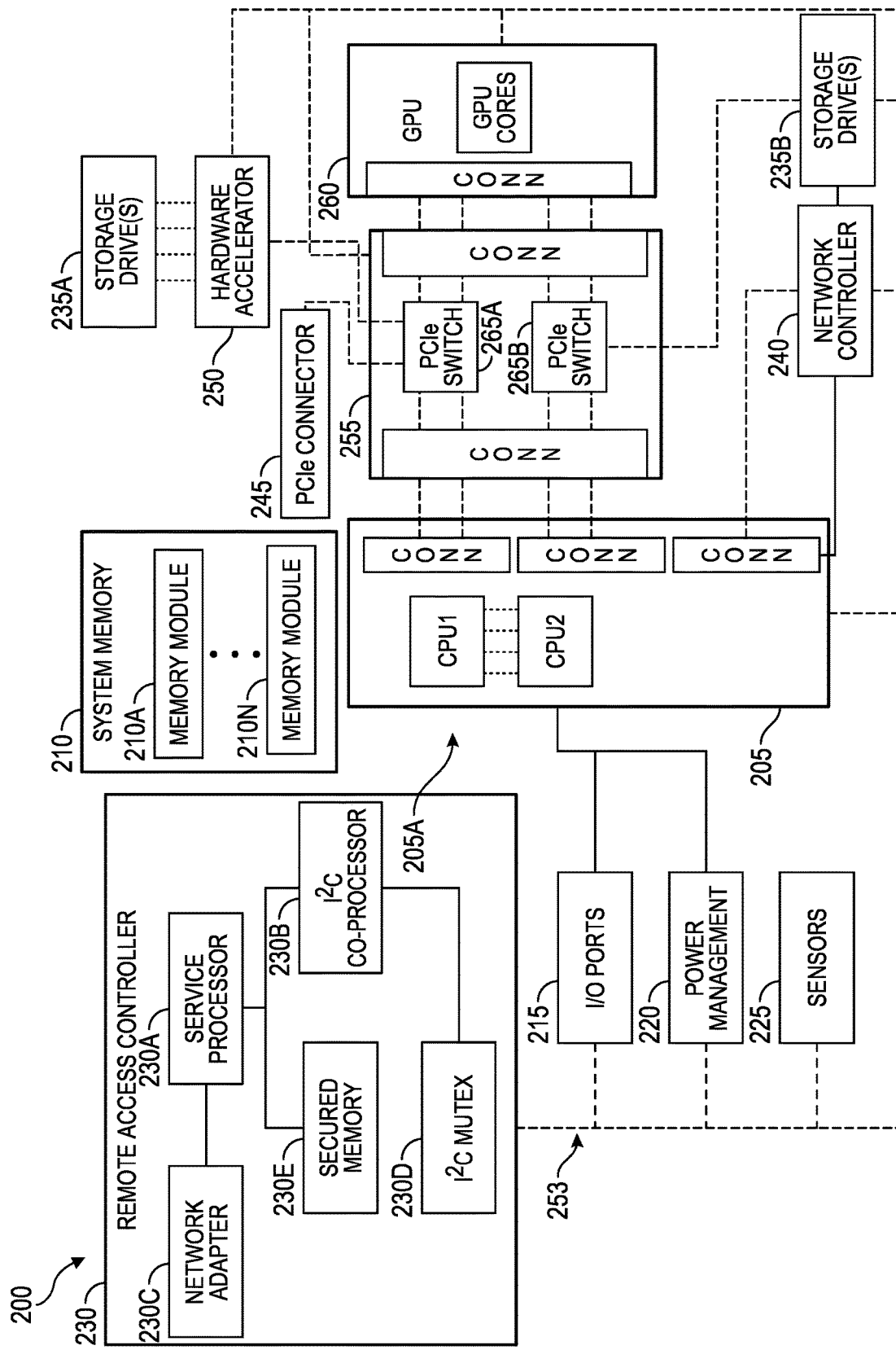
FIG. 2 illustrates an example of an IHS configured to implement systems and methods described herein according to one embodiment of the present disclosure.

In certain embodiments, each individual sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business, and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are expected in the administration and operation of data centers, but it is preferable to avoid any downtime in making such firmware updates. For instance, in updating the firmware of the individual hardware components of the chassis 100, it is preferable that such updates can be made without having to reboot the chassis. As described in additional detail below, it is also preferable that updates to the firmware of individual hardware components of sleds 105a-n, 115a-n be likewise made without having to reboot the respective sled of the hardware component that is being updated.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and sideband (i.e., out-of-band) communications with various managed components of a respective sled 105a-n and chassis 100. Remote access controllers 110a-n, 120a-n may collect diverse types of sensor data, such as collecting temperature sensor readings that are used in support of airflow cooling of the chassis 100 and the sled 105a-n, 115a-n. In addition, each remote access controller 110a-n, 120a-n may implement various monitoring and administrative functions related to a respective sled 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 105a-n, 115a-n, without having to reboot the chassis or any of the sleds 105a-n, 115a-n.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to all of the storage drives 175a-n installed in a chassis 100, or to all of the storage drives 175a-n of a particular model or manufacturer. In some instances, remote management interface 101 may include an inventory of the hardware, software, and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, which may be programmed and adapted for specific computing tasks, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be an integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources (e.g., JBOD 155) may be accessed via a SAS expander 150 that is coupled to the backplane 160 of the chassis 100. The SAS expander 150 may support connections to a number of JBOD (Just a Bunch of Disks) storage resources 155 that, in some instances, may be configured and managed individually and without implementing data redundancy across the various drives. The additional JBOD storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, firmware updates may be initiated for a large number of storage drives, such as for all SSDs installed in chassis 100.

As illustrated, the chassis 100 of FIG. 1 includes a network controller 140 that provides network access to the sleds 105a-n, 115a-n installed within the chassis. Network controller 140 may include various switches, adapters, controllers, and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 145 that may support various I/O ports, such as USB ports that may be used to support keyboard and mouse inputs and/or video display capabilities. Each of the I/O controllers 145 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power supply unit 135, network controller 140 and airflow cooling fans 130 that are available via the chassis 100. As described, the airflow cooling fans 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein according to one embodiment of the present disclosure. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as a 1RU server installed within a 2RU chassis, which is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to diverse types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line buses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as a NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of HIS 200, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be connected to the IHS via a removable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, which may be used to implement functions used to support devices coupled to the IHS 200. In some embodiments, the processing cores of hardware accelerator 250 include ARM (advanced RISC (reduced instruction set computing) machine) processing cores. In other embodiments, the cores of the DPUs may include MIPS (microprocessor without interlocked pipeline stages) cores, RISC-V cores, or CISC (complex instruction set computing) (i.e., x86) cores. Hardware accelerator 250 may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support of high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include one or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs 260 may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the CPUs 205 and other components of IHS 200, thus allowing the remote access controller 230 to operate, and manage tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, which operates management software that supports remote monitoring and administration of IHS 200. The management operations supported by remote access controller 230 may be remotely initiated, updated, and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 230 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230e for exclusive use by the remote access controller in support of management operations.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 253. In some embodiments, the remote access controller 230 may additionally or alternatively use MCTP messaging to transmit Vendor Defined Messages (VDMs) via the in-line PCIe switch fabric supported by PCIe switches 265a-b. In some instances, the sideband management connections supported by remote access controller 230 may include PLDM (Platform Level Data Model) management communications with the managed devices 205, 235a-b, 240, 250, 255, 260 of IHS 200.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 230 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus 253. For instance, messages utilized in device and/or system management may be transmitted using I2C sideband bus 253 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or indirectly, via in-line buses that are separate from the I2C sideband bus 253 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The I2C sideband bus 253 is illustrated as single line in FIG. 2. However, sideband bus 253 may be comprised of multiple signaling pathways, where each may be comprised of a clock line and data line that couple the remote access controller 230 to I2C endpoints 205, 235a-b, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
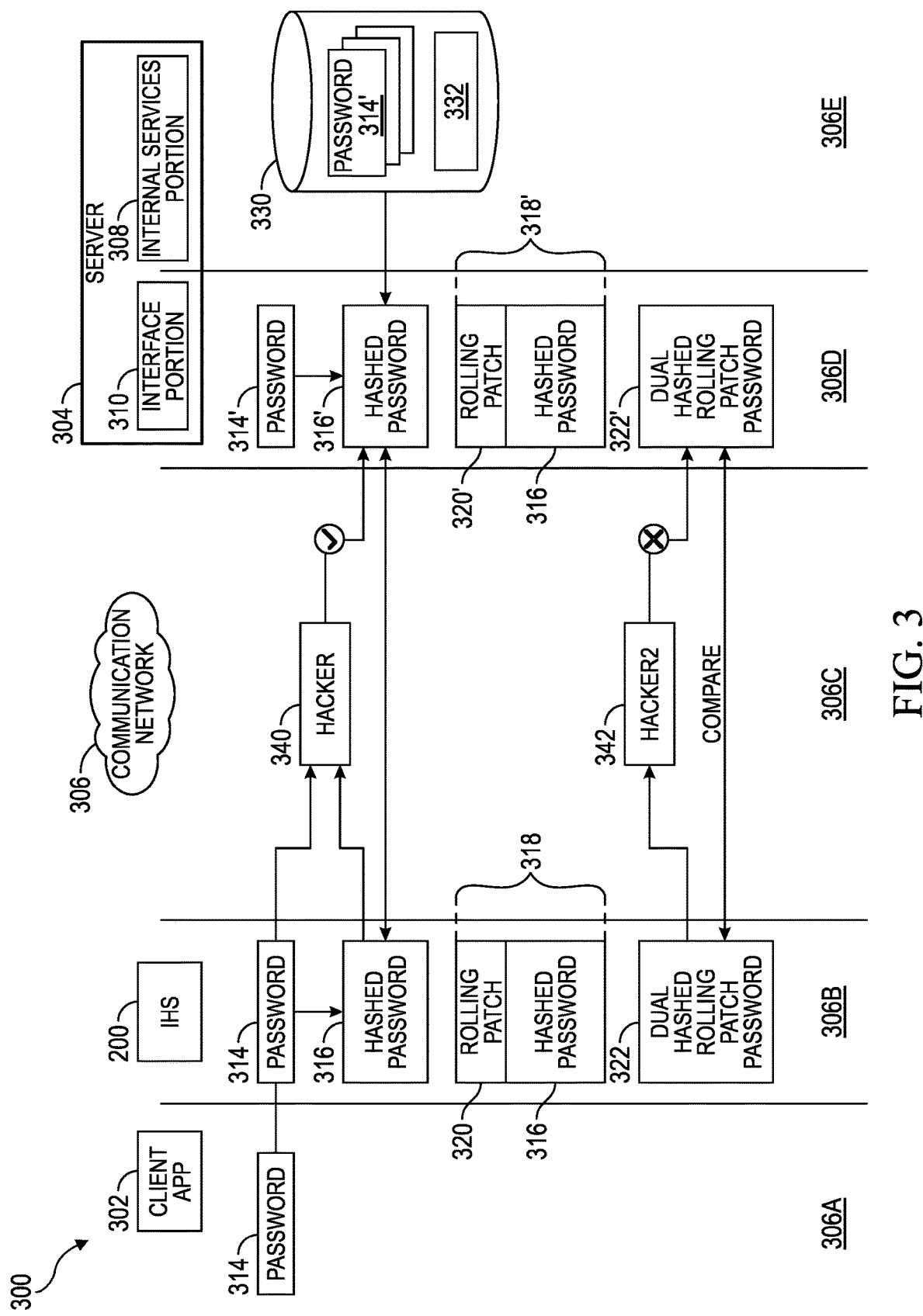
FIG. 3 illustrates an example computing environment in which the dual hashed rolling patch encryption system and method may be used according to one embodiment of the present disclosure.

FIG. 3 illustrates an example computing environment 300 in which the dual hashed rolling patch encryption system and method may be used according to one embodiment of the present disclosure. The computing environment 300 includes a client application (app) 302 executed on a client IHS 200 that communicates with a server 304 through a communication network 306. In one embodiment, the communication network 306 comprises a publicly available network, such as Internet, thus forming several different domains of trust. A domain of trust generally refers to a region within which a group of IHSs, their operations, and the data they use are trusted among one another.

A client app domain 306a generally involves activities that are performed within the client app 302 and thus have a relatively high level of trust. An IHS domain 306b generally involves activities that may include other processes running in the IHS 200 and thus possess a somewhat lesser level of trust. An internal services portion 308 of the server 304, which is in an internal server domain 306e involves activities that are conducted within and thus are considered to possess a relatively high level of trust. An interface portion 310 of the server 304, which is in a server interface domain 306d involves activities that are shared with other processes in the server 304 and thus possess a relatively lower level of trust. The communication network 306, which is in a publicly accessible domain 306c, nevertheless possesses a low level of trust because, among other things, anyone can access and use data that traverses across this publicly accessible domain 306c.

According to embodiments of the present disclosure, the dual hashed rolling patch system may receive a password 314 obtained from the client app 302, encrypt the password 314 to form a hashed password 316, generate a rolling patch 320, concatenate the rolling patch 320 to the hashed password 316 to form a patched hashed password 318, which is then hashed again to form a dual hashed rolling patch password 322.

When the dual hashed rolling patch password 322 arrives at the server 304, the server interface portion 310 obtains a stored version 314' of the password 314 from a data store 330 configured in the server 304. The server 304 knows which stored version 314' to obtain because the dual hashed rolling patch password 322 has been encoded with username credentials associated with the request. The server 304 then encrypts the stored version 314' to form a hashed version 316' of the hashed password 316, concatenates a server version 320' of the rolling patch 320 to the hashed version 316' to form another patched hashed password 318', and encrypts the patched hashed password 318' to form another dual hashed rolling patch password 322'. Once the dual hashed rolling patch password 322' has been created, the server 304 then compares the dual hashed rolling patch password 322' with the received dual hashed rolling patch password 322 to determine if they match, and if so, authenticate the request.

Because the IHS 200 and the server 304 share the knowledge of the rolling patch 320, the server 304 can successfully create the same dual hashed rolling patch password 322' that was also hashed by the IHS 200. In one embodiment, the encryption used to generate the dual hashed rolling patch password 322 and/or the hashed password 316 comprises a one way conversion encryption technique. That is, the password 314 cannot be reversely obtained using the hashed data without access to the rolling character string that was used to encrypt the password 314.

The rolling patch 320 may include any combination of alpha-numerical text characters whose values continually change over time. One example of such a rolling patch 320 may include a whole or a portion of a datestamp and/or a timestamp. In one embodiment, the datestamp may be specified with a particular time to live, which is configurable. For example, both the client IHS 200 and the server 304 may obtain a timestamp, and save that value for a specified amount of time (e.g., 60 seconds, 60 minutes, etc.), and at the end of that time period obtain another timestamp, and repeat the aforedescribed process at an ongoing basis.

Any type of continually changing characters, such as an RSA key may be used. For example, the dual hashed rolling patch system may use a token provided by a certificate authority (CA) (not shown) that provides the token to both the IHS 200 and server 304 at ongoing intervals (e.g., periodically) or each time the password 314 is hashed by the IHS 200. In one embodiment, the CA may be one that conforms to an openID Connect (OIDC) authentication protocol. The OIDC authentication protocol builds on earlier authentication protocols (e.g., Oauth, openID, etc.) to verify a user's identity when attempting to access protected HTTP end points. The OIDC authentication protocol provides federated identity, which links a user's digital identity across separate security domains. In other words, when two applications are federated, a user can use one application by authenticating their identity with the other, without needing to create separate usernames/passwords for both. It should be appreciated that other global authentication authorities (e.g., Oauth, OpenID Connect, SAML, and WS-Federation, etc.) may be implemented with the dual hashed rolling patch system without departing from the spirit and scope of the present disclosure.

The data may be hashed using any suitable encryption technique. In one embodiment, the password 314 may be hashed using a SHA256 hashing algorithm with a length of 64 alphanumeric characters. Such a length may be sufficient and complex enough for today's typical complex password requirements. For example, data hashed using the SHA256 hashing algorithm with 64 characters may produce 1.16e77 quantity of permutations meaning that there is relatively little likelihood that two different passwords can be translated to the same hash value.

When the internal services portion 308 of the server 304 receives the hashed password 314, it may compare it against a stored version 314' of the hashed password 314 in a data store 330, and if it matches, the client app 302 will be successfully authenticated. In one embodiment, if the match is successful, the internal services portion 308 may add the client app 302 (e.g., IP address) to a known source (KS) list 332.

It may be important to note that the password 314 is never revealed from the server 302 or from the IHS 200 since it is hashed using a one-way translation. In some embodiments, using a different password for different authentication services may not be necessary since each authentication server 304 may utilize different token generation policies. That is, the user may be alleviated from the requirement of using multiple passwords 314, one for each account. Additionally, changing of the password at ongoing intervals may not be necessary since the transmitted dual hashed rolling patch password 322 uses a rotating patch element.

As done using conventionally, if a first hacker 340 were to gain access to either the password 314 and/or hashed password 316, they can easily circumvent the security of a conventional authentication system by supplying the stolen password 314 and/or hashed password 316 directly to the server 304. Using the dual hashed rolling patch system according to the teachings of the present disclosure, however, a second hacker 342 cannot simply provide a stolen dual hashed rolling patch password 322 to the server 304 because the rolling patch 320 would be stale after each iteration.

Figure 4:
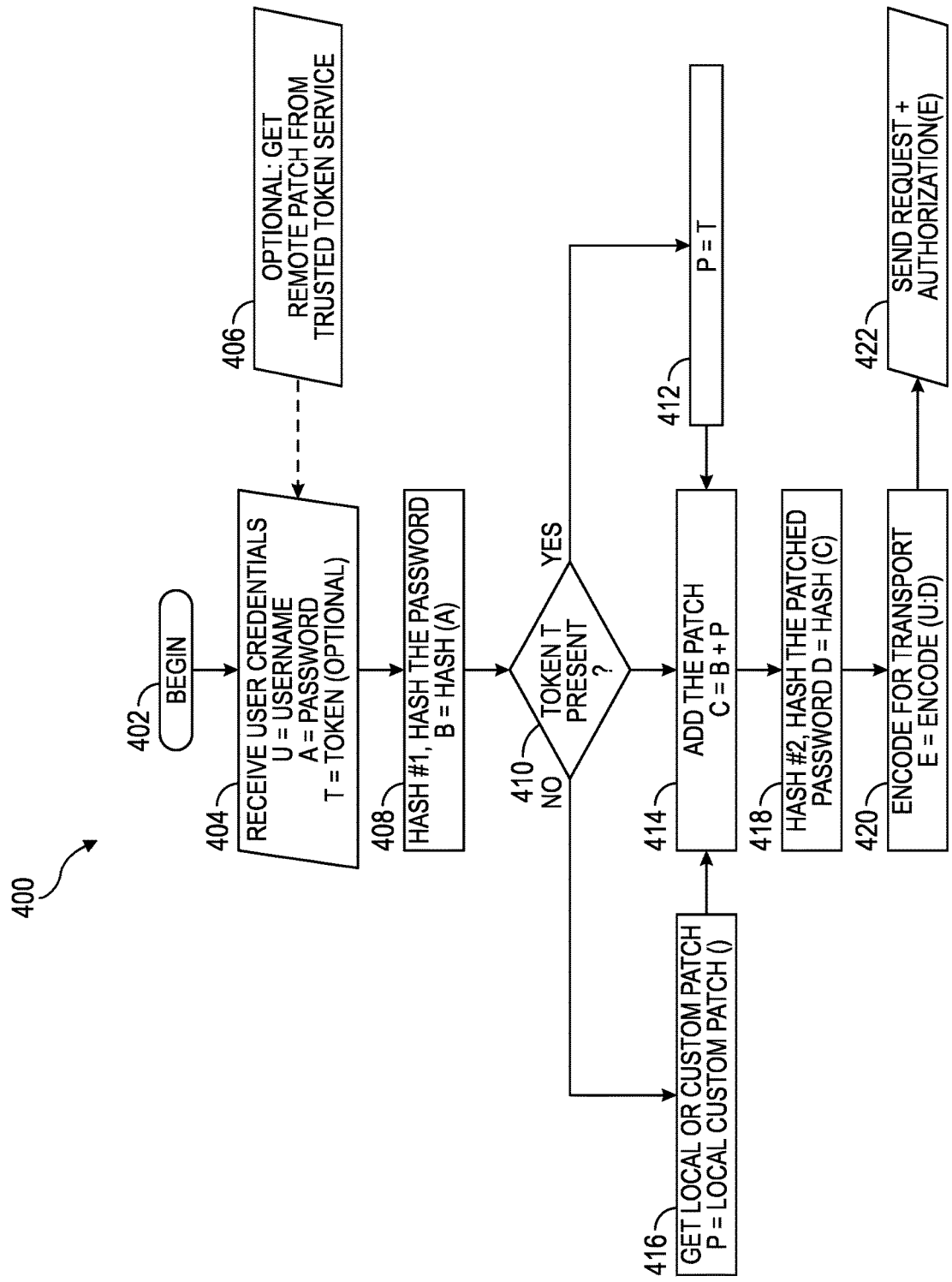
FIG. 4 is a flowchart illustrating an example client-side dual hashed rolling patch method depicting how the IHS may generate and send the dual hashed rolling patch password to the server according to one embodiment of the present disclosure.

FIG. 4 is a flowchart illustrating an example client-side dual hashed rolling patch method 400 depicting how the IHS 200 may generate and send the dual hashed rolling patch password 322 to the server 304 according to one embodiment of the present disclosure. In one embodiment, the dual hashed rolling patch method 400 may be performed in whole, or in part, by the IHS 200 as described herein above. In other embodiments, the method 400 may be performed by any suitable IHS or combination of IHSs 200, such as those that are configured on a publicly available network.

Initially at step 402, the method 400 starts. At step 404, the IHS 200 receives user credentials, such as a username (U) and a password (A). For example, the IHS 200 may receive the user credentials from the remote management interface 101. Optionally at step 406, the IHS 200 may receive a token (T) from a trusted token service such that token may be used as the patch (P). At step 408, the IHS 200 encrypts the password (P). In one embodiment, the IHS 200 encrypts the password (P) by generating a hash of the password using a cryptographic hash function (e.g., SHA256), such as one that is a one-way function that is practically infeasible to inverse the calculation.

The IHS 200 then determines whether or not the token (T) is present at step 410. If so, processing continues at step 412 in which the patch (P) is set to the value of the token (T). However, at step 416 if no token (T) is present, the IHS 200 obtains the patch (P) using any suitable technique such as described above. For example, the IHS 200 may generate the token by setting the patch (P) to be equal to all or a truncated portion of a timestamp from a real-time clock configured in the IHS 200. After processing either of steps 412 or 416, the IHS 200 adds the patch (P) to the hashed password at step 414. For example, the IHS 200 may add the patch (P) by concatenating the alpha-numerical text string comprising the patch (P) to the hashed password to form the patched hashed password (C).

At step 418, the IHS 200 encrypts the patched hashed password (C) to form the hashed patched password (D). That is, the IHS 200 may encrypt the patched hashed password (C) using the same or different hash function that was previously performed above at step 408. Thereafter at step 420, the IHS 200 encodes the hashed patched hatched password (D) with the username (U) to form an encoded request (E) for transport to the server, and at step 422, sends the hashed patched password (D) as a request for authorization to the server. At this point, the IHS 200 waits for confirmation from the server that authentication has been successful or not.

The aforedescribed method 400 may be performed each time the IHS 200 attempts to authenticate with the server 304 using the dual hashed rolling patch system. Nevertheless, when use of the selective rebootless firmware update method 400 is no longer needed or desired, the process ends.

Figure 5A:
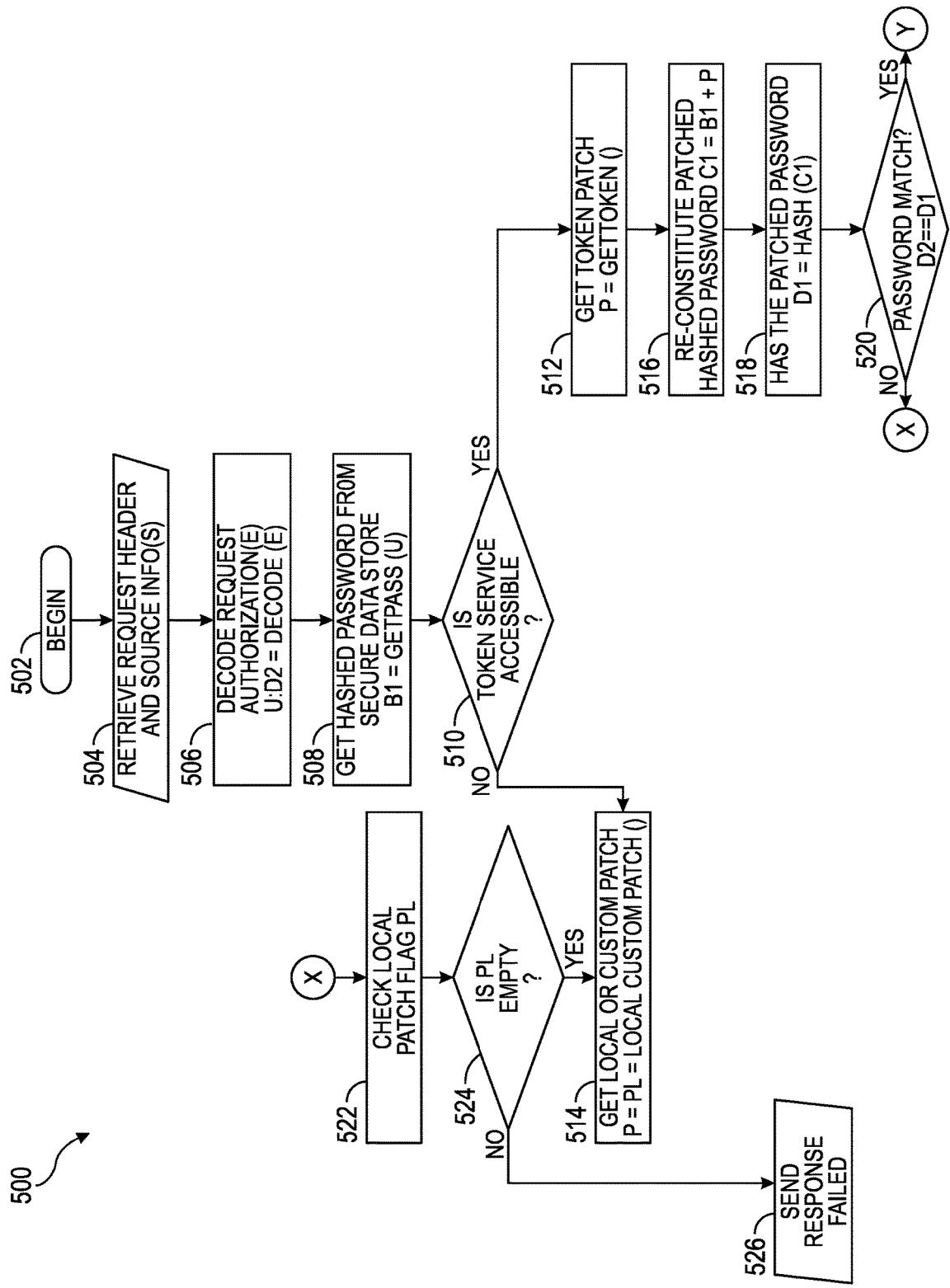
FIGS. 5A and 5B illustrate an example server-side dual hashed rolling patch method showing how the server may authenticate the hashed patched password generated according to the client-side dual hashed rolling patch method according to one embodiment of the present disclosure.
Figure 5B:
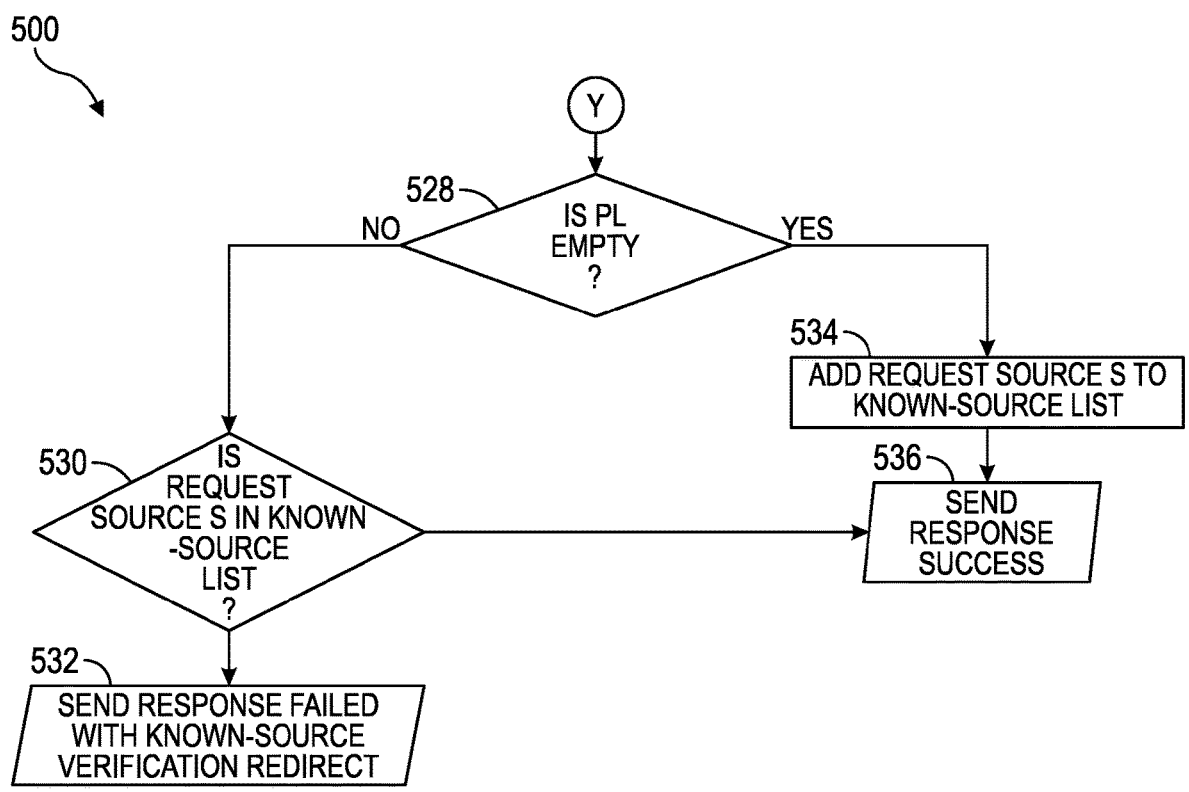

FIGS. 5A and 5B illustrate an example server-side dual hashed rolling patch method 500 showing how the server 304 may authenticate the hashed patched password (D) generated according to the client-side dual hashed rolling patch method 400 according to one embodiment of the present disclosure. In one embodiment, the dual hashed rolling patch method 400 may be performed in whole, or in part, by the server 304 as described herein above. In other embodiments, the method 400 may be performed by any suitable IHS or combination of IHSs 200, such as those that are configured on a publicly available network, such as the Internet.

At step 502, the method 500 starts. At step 504, the server 304 receives the encoded request (E) from the IHS 200. For example, the method 500 receives the encoded request (E) that was sent from the IHS 200 at step 422. The server 304 then decodes the encoded request (E) to obtain the username (U) and hashed patched password (D2) at step 506, and at step 508, gets a hashed password (B1) from the data store 330 using the username (U) obtained above at step 506.

At step 510, the server 304 determines whether the token (T) is available at step 510. If so, processing continues at step 512 in which the server 304 obtains the patch (P). For example, the server 304 may obtain the patch (P) from the same certificate authority that issued the token to the IHS 200 at step 406. However, if no token (T) is available, processing continues at step 514 in which the server 304 obtains the patch (P) using a suitable technique such as described above. After processing either of steps 512 or 514, the server 304 generates another patched hashed password (C1) by adding the patch (P) generated at either of steps 512 or 514 to the hashed password (B1) obtained from the server's data store 330 at step 516.

At step 518, the server 304 encrypts the patched hatched password (C1) to generate a hashed patched hatched password (D1), and at step 520, determines whether the hashed patched hatched password (D1) matches the hashed patched hatched password (D) that was received from the IHS 200. If not, processing continues at step 522 in which the server 304 checks for a flag (PL) indicating that the hashed patched hatched password (D) was generated using a patch (P) obtained locally within the IHS 200 as opposed to a token (T).

Thereafter at step 524, the server 304 determines whether or not the flag (PL) is empty (not set) indicating that the token (T) was not used as the patch (P). If not, the authentication request has failed such that a failure response message is returned to the IHS 200 in which at this point, the dual hashed rolling patch method 500 ends at step 526. If, however, the flag (PL) indicates that the hashed patched hatched password (D) was generated using a patch (P) generated locally within the IHS 200, the dual hashed rolling patch method 500 proceeds at step 514 in which the server 304 obtains the patch (P) locally using the same technique as used by the IHS 200. For example, if the IHS 200 obtained the patch (P) using all or a portion of a timestamp generated by its system clock, the server would also generate its patch (P) using all or a portion of a timestamp generated by its system clock. Once generated, the server 304 continues processing at step 516 to generate another patched hashed password (C1) by adding the generated patch (P) to the hashed password (B1) obtained from the server's data store 330 at step 516. Ensuing steps 518 and 520 are performed as described herein above.

When the hashed patched hatched password (D1) matches the hashed patched hatched password (D) that was received from the IHS 200, steps 528-536 may be performed to provide an additional check as to whether the authentication request should be allowed or not. Generally speaking, because the token (T) described above was sent through the publicly available network 306, which is inherently insecure, a would be hacker could potentially perform a man-in-the-middle attack by sending a malicious request that includes the token (T) to gain illicit access to the system. As such, the system is configured to only allow authentication requests using token (T) to those IHSs 200 that have previously established a successful authentication using a locally generated patch (P).

At step 528, the server 304 determines whether the token flag (PL) is set indicating that the hashed patched hatched password (D) was created using a token (T). If not, processing continues at step 530 in which the server 304 determines whether the IHS 200 is included in a known source (KS) list 332. If the IHS 200 is included in the known source list 332, processing continues at step 536 in which the IHS 200 is successfully authenticated such that a 'success' response is returned to the IHS 200 in which the method 500 ends. If, however, the IHS 200 is not included in the known source list 332, processing continues at step 532 in which the authentication request fails such that a 'failed' response is returned to the IHS 200 in which the method 500 ends.

If at step 528, the server 304 determines that the token flag (PL) indicates that the hashed patched hatched password (D) was created using a locally generated patch (P), processing continues at step 534 in which the IHS 200 is added to the known source list 332, and at step 536 the IHS 200 is successfully authenticated such that a 'success' response is returned to the IHS 200 in which the method 500 ends.

The aforedescribed method 500 may be performed each time an authentication request is received from an IHS 200. Nevertheless, when use of the selective rebootless firmware update method 500 is no longer needed or desired, the process ends.

Although FIGS. 4, 5A, and 5B describes example methods 400, 500 that may be performed to authenticate the IHS 200 with the server 304, the features of the disclosed processes may be embodied in other specific forms without deviating from the spirit and scope of the present disclosure. For example, certain steps of the disclosed methods 400, 500 may be performed sequentially, or alternatively, they may be performed concurrently. As another example, the methods 400, 500 may perform additional, fewer, or different operations than those operations as described in the present example.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A client Information Handling System (IHS) comprising:
   at least one processor; and
   a memory coupled to the at least one processor, the memory having program instructions stored thereon that, upon execution by the processor, cause the client IHS to:
     receive a password comprising a first plurality of characters;
     generate a hashed password from the password;
     concatenate a second plurality of characters to the hashed password to form a patched password, wherein the second characters are configured to continually change value over time;
     encrypt the patched password; and
     send the patched password to a server IHS for authentication;
   wherein the server IHS comprises:
     at least one other processor, and
     another memory coupled to the at least one other processor, the other memory having other program instructions stored thereon that, upon execution by the other processor, cause the server IHS to:
       obtain a stored version of the first plurality of characters from a data store configured in the server IHS;
       concatenate a third plurality of characters to the stored version to form another patched password, wherein the third characters are similar to the second characters;
       encrypt the another patched password; and
       compare the patched password against the another patched password to determine whether to authenticate the client IHS.

2. The client IHS of claim 1, wherein the instructions, upon execution, cause the IHS to encrypt the password prior to concatenating the second plurality of characters to the password.

3. The client IHS of claim 1, wherein the other instructions, upon execution, cause the server IHS to:
   when the hashed patched password and the other hashed patched password do not match, reject authentication of the client IHS when the third plurality of characters comprises a token and when an identity of the client IHS does not exist in a known sources (KS) file stored in the server IHS.

4. The client IHS of claim 1, wherein the other instructions, upon execution, cause the server IHS to:
   when the hashed patched password against the other hashed patched password match, accept authentication of the client IHS when the third plurality of characters comprises a token and when an identity of the client IHS does exist in a known sources (KS) file stored in the server IHS.

5. The client IHS of claim 1, wherein the instructions, upon execution, cause the client IHS to encrypt the patched password by generating a hash of the password using a cryptographic hash function, wherein the cryptographic hash function comprises a one-way function.

6. The client IHS of claim 1, wherein the second characters comprises at least one of letters, numerals, and symbols.

7. The client IHS of claim 1, wherein the second characters comprise a timestamp generated by a real-time clock of the client IHS.

8. The client IHS of claim 1, wherein the second characters comprise a token generated by a remotely configured certificate authority (CA).

9. A method comprising:
   receiving, by a client Information Handling System (IHS), a password comprising a first plurality of characters;
   generating a hashed password from the password;
   concatenating, by the client IHS, a second plurality of characters to the hashed password to form a patched password, wherein the second characters are configured to continually change value over time;
   encrypting, by the client IHS, the patched password;
   sending, by the client IHS, the patched password to a server Information Handling System (IHS) for authentication;
   obtaining, by a server IHS, a stored version of the first plurality of characters from a data store configured in the server IHS;
   concatenating, by the server IHS, a third plurality of characters to the stored version to form another patched password, wherein the third characters are similar to the second characters;
   encrypting, by the server IHS, the another patched password; and comparing, by the server IHS, the patched password against the another patched password to determine whether to authenticate the client IHS.

10. The method of claim 9, further comprising encrypting the password prior to concatenating the second plurality of characters to the password.

11. The method of claim 9, further comprising, when the hashed patched password and the other hashed patched password do not match, rejecting authentication of the client IHS when the third plurality of characters comprises a token and when an identity of the client IHS does not exist in a known sources (KS) file stored in the server IHS.

12. The method of claim 9, further comprising, when the hashed patched password against the other hashed patched password match, accepting authentication of the client IHS when the third plurality of characters comprises a token and when an identity of the client IHS does exist in a known sources (KS) file stored in the server IHS.

13. The method of claim 9, further comprising encrypting the patched password by generating a hash of the password using a cryptographic hash function, wherein the cryptographic hash function comprises a one-way function.

14. A server Information Handling System (IHS) comprising:
   at least one processor; and
   a memory coupled to the at least one processor, the memory having program instructions stored thereon that, upon execution by the processor, cause the server IHS to:
     obtain a stored version of a first plurality of characters from a data store configured in the server IHS, the first characters comprising a password;
     generate a hashed password from the password;
     concatenate a stored version of a second plurality of characters to the hashed password to form a patched password, wherein the second characters are configured to continually change value over time;
     encrypt the patched password; and
     compare the patched password against another patched password obtained from a client IHS to determine whether to authenticate the client IHS;
   wherein the client IHS comprises:
     at least one other processor; and
     another memory coupled to the at least one other processor, the other memory having other program instructions stored thereon that, upon execution by the other processor, cause the client HIS to:
       receive the first plurality of characters;
       concatenate a third plurality of characters to the first plurality of characters to form another patched password, wherein the third characters are similar to the second characters;
       encrypt the another patched password; and
       send the another patched password to a server IHS for authentication.

15. The server IHS of claim 14, wherein the instructions, upon execution, cause the IHS to encrypt the password prior to concatenating the second plurality of characters to the password.

16. The server IHS of claim 14, wherein the instructions, upon execution, cause the server IHS to:
   when the hashed patched password and the other hashed patched password do not match, reject authentication of the client IHS when the third plurality of characters comprises a token and when an identity of the client IHS does not exist in a known sources (KS) file stored in the server IHS.

17. The server IHS of claim 14, wherein the other instructions, upon execution, cause the server IHS to:
   when the hashed patched password against the other hashed patched password match, accept authentication of the client IHS when the third plurality of characters comprises a token and when an identity of the client IHS does exist in a known sources (KS) file stored in the server IHS.

* * * * *

UNITED STATES PATENT AND TRADEMARK OFFICE
CERTIFICATE OF CORRECTION

PATENT NO. : 12,225,134 B2
APPLICATION NO. : 18/047363
DATED : February 11, 2025
INVENTOR(S) : Christopher Abella Poblete Page 1 of 1

It is certified that error appears in the above-identified patent and that said Letters Patent is hereby corrected as shown below:

In the Claims

In Column 22, Line 9, Claim 14, delete "the other processor, cause the client HIS to:" and insert -- the other processor, cause the client IHS to: -- therefor.

Signed and Sealed this
Eleventh Day of March, 2025

Coke Morgan Stewart
*Acting Director of the United States Patent and Trademark Office*